United States Patent
Luthra et al.

(10) Patent No.: US 12,301,421 B2
(45) Date of Patent: May 13, 2025

(54) SYSTEM AND METHOD FOR PROVIDING A CLOUD RESOURCE OPTIMIZATION POLICY IN TELECOMMUNICATIONS SYSTEM

(71) Applicants: RAKUTEN MOBILE, INC., Tokyo (JP); Rakuten Symphony, Inc., Tokyo (JP)

(72) Inventors: Mohit Luthra, Singapore (SG); Awn Muhammad, Tokyo (JP); Pankaj Shete, Tokyo (JP)

(73) Assignees: RAKUTEN SYMPHONY, INC., Tokyo (JP); RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/012,474

(22) PCT Filed: Nov. 14, 2022

(86) PCT No.: PCT/US2022/049762
§ 371 (c)(1),
(2) Date: Dec. 22, 2022

(87) PCT Pub. No.: WO2024/043918
PCT Pub. Date: Feb. 29, 2024

(65) Prior Publication Data
US 2024/0250878 A1    Jul. 25, 2024

(30) Foreign Application Priority Data
Aug. 25, 2022 (SG) .............................. 10202250828F (51) Int. Cl.
*G06F 15/16* (2006.01)
*H04L 41/0823* (2022.01)
*H04L 41/0894* (2022.01)

(52) U.S. Cl.
CPC ...... *H04L 41/0894* (2022.05); *H04L 41/0823* (2013.01)

(58) Field of Classification Search
CPC ........................ H04L 41/0894; H04L 41/0823
See application file for complete search history.

(56) References Cited

U.S. PATENT DOCUMENTS

2021/0258866 A1* 8/2021 Chou .................... H04W 48/16
2022/0038902 A1* 2/2022 Mueck .................... G06F 21/57
(Continued)

OTHER PUBLICATIONS

International Search Report issued Mar. 8, 2023 in Application No. PCT/US2022/049762.
(Continued)

*Primary Examiner* — Padma Mundur
(74) *Attorney, Agent, or Firm* — Sughrue Mion, PLLC (57) ABSTRACT

A system for implementing an open cloud (O-Cloud) optimization policy by an application hosted in a near real-time radio access network Intelligent Controller (nRT-RIC) of a telecommunications network. The system includes a memory storing instructions; and at least one processor configured to implement the nRT-RIC within an open radio access network (O-RAN) architecture, the at least one processor configured to execute the instructions to: receive the O-Cloud optimization policy from a non-real-time radio access network Intelligent Controller (NRT-RIC) within a Service Management and Orchestration (SMO) framework of the telecommunications network; control to implement the O-Cloud optimization policy in the O-Cloud computing environment within the O-RAN.

25 Claims, 5 Drawing Sheets

(56) References Cited

U.S. PATENT DOCUMENTS

| | | | | |
|---|---|---|---|---|
| 2022/0150723 A1* | 5/2022 | Tsai | ................. | H04W 48/18 |
| 2022/0253293 A1* | 8/2022 | Pontecorvi | ............. | G06F 8/60 |
| 2022/0264437 A1* | 8/2022 | Raghavachari | ....... | H04W 48/18 |
| 2022/0345361 A1* | 10/2022 | Yang | ................. | H04L 45/745 |
| 2023/0126312 A1* | 4/2023 | Tsai | ................. | H04L 67/55 |
| | | | | 709/217 |
| 2023/0362809 A1* | 11/2023 | Dixit | ................. | H04W 24/02 |

OTHER PUBLICATIONS

Written Opinion issued Mar. 8, 2023 in Application No. PCT/US2022/049762.

Evelina N. Pencheva, et al., "Toward Programmability of Radio Resource Control Based on O-RAN", Cybernetics and Information Technologies, vol. 22, No. 3, pp. 161-178 (18 pages).

\* cited by examiner

SYSTEM AND METHOD FOR PROVIDING A CLOUD RESOURCE OPTIMIZATION POLICY IN TELECOMMUNICATIONS SYSTEM

CROSS-REFERENCE TO RELATED APPLICATION(S)

This application is based on and claims priority from Singapore Provisional Patent Application No. 10202250828F, filed at the Singaporean Patent Office on Aug. 25, 2022, the disclosure of which is incorporated by reference herein in its entirety.

TECHNICAL FIELD

Systems and methods consistent with example embodiments of the present disclosure relate to providing an open radio access network O-RAN Architecture for open cloud O-Cloud resource optimization via near real-time (nRT-RIC). In particular, systems and methods relate to implementing an open cloud (O-Cloud) optimization policy of a non-real-time radio access network (RAN) Intelligent Controller (NRT-RIC) within a Service Management and Orchestration (SMO) framework of a telecommunications network by an application hosted in a near real-time radio access network Intelligent Controller (nRT-RIC) of a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, the hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

Figure 1:
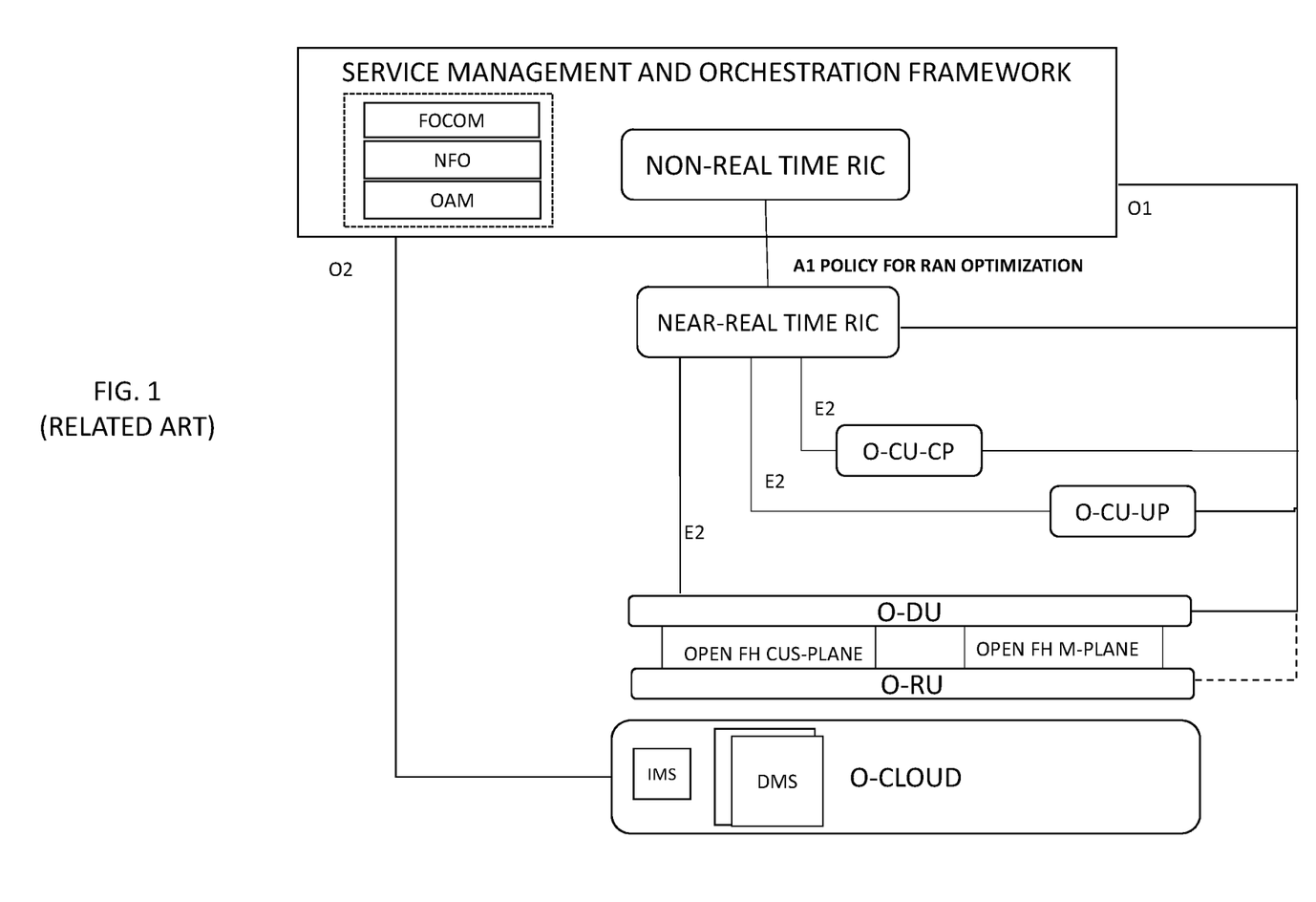
FIG. 1 illustrates an O-RAN architecture according to the related art.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps. The functionalities include: providing policy (i.e., a set of rules that are used to manage and control the changing and/or maintaining of the state of one or more managed objects) based on guidance and enrichment across the A1 interface, which is the interface that enables the communication between the NRT-RIC and the nRT-RIC (i.e., an A1 policy that is, according to the related art, a type of declarative policies expressed using formal statements that enable the NRT-RIC within the SMO to guide the nRT-RIC, and hence the RAN, towards better fulfillment of the RAN intent); performing data analytics; Artificial Intelligence/Machine Learning (AI/ML) training and inference for RAN optimization; and/or recommending configuration management actions over the O1 interface for managing the operation and maintenance (OAM), which is the interface that connects the SMO to RAN managed elements (e.g., nRT-RIC, O-RAN centralized Unit (O-CU), O-RAN Distributed Unit (O-DU), etc.).

The nRT-RIC is located at the edge of the RAN and operates on a timescale between 10 milliseconds and 1 second. The nRT-RIC connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/ network functions (NFs)) over a near-real-time control loop. The nRT-RIC monitors, suspends/stops, overrides, and controls the E2 nodes (O-CU-CP, O-CU-UP, O-DU, and O-eNB) via policies, wherein the O-DU connects to the O-RU over the FrontHaul including a Control User Synchronization (CUS) plane and the Management (M) plane. For example, the nRT sets policy parameters on activated functions of the E2 nodes. Further, the nRT-RIC hosts xApps to implement functions such as quality of service (QoS) optimization, mobility optimization, slicing optimization, interference mitigation, load balancing, security, etc. The two types of RICs work together to optimize the O-RAN. For example, the NRT-RIC provides, over the A1 interface, the policies, data, and AI/ML models enforced and used by the nRT-RIC for RAN optimization, and the nRT returns policy feedback (i.e., how the policy set by the NRT-RIC works).

The SMO framework manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and container (i.e., instance) based VNF, and the OAM as a part of the SMO that manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

According to the related art as illustrated in FIG. 1, the NRT-RIC creates a RAN optimization policy (i.e., A1 policy for RAN optimization to fulfill the RAN intent). The NRT-RIC then passes that policy to the nRT-RIC over the A1 interface (i.e., an A1 policy). Upon receiving the A1 policy, the nRT-RIC controls to implement the policy and performs in a control loop as per said policy guidance.

Moreover, according to the related art there is no near real time interface to connect the nRT-RIC to the O-Cloud (i.e., an interface between the nRT-RIC and the O2 management services such as the IMS and/or the DMS). As result, the A1 policy management according to the related art is limited to RAN optimization, and does not provide for O-Cloud optimization policies for the nRT-RIC. The absence of this near real time interface prevents the nRT-RIC from controlling the O-Cloud resources close to real time as set forth above and may lead to high latency responses and an unbalanced utilization of O-Cloud computational and hardware resources.

SUMMARY

According to embodiments, systems and methods are provided for implementing an open cloud (O-Cloud) optimization policy of a non-real-time radio access network Intelligent Controller (NRT-RIC) within a Service Management and Orchestration (SMO) framework of a telecommunications network by an application hosted in a near real-time radio access network Intelligent Controller (nRT-RIC) of a telecommunications network, wherein the nRT-RIC receives an O-Cloud optimization policy from the NRT-RIC and controls to implement the O-Cloud optimization policy in the O-Cloud computing environment within the O-RAN via a direct interface between the nRT-RIC and the O-Cloud computing environment. In particular, system and methods provide for an O-RAN architecture for O-Cloud resource optimization via the nRT-RIC, by including an interface between the nRT-RIC and the O-Cloud that enables a defined response time between 10 ms and 1 s and allows a reduction of O-Cloud resource control latency. The low latency O-Cloud resource control results in a faster implementation of O-cloud optimization policies, which has the advantage that an energy-efficient network operation of the O-cloud computing environment can be achieved.

According to an embodiment, a system for implementing an open cloud (O-Cloud) optimization policy by an application hosted in a near real-time radio access network Intelligent Controller (nRT-RIC) of a telecommunications network, includes: a memory storing instructions; and at least one processor configured to implement the nRT-RIC within an open radio access network (O-RAN) architecture, the at least one processor configured to execute the instructions to: receive the O-Cloud optimization policy from a non-real-time radio access network Intelligent Controller (NRT-RIC) within a Service Management and Orchestration (SMO) framework of the telecommunications network; control to implement the O-Cloud optimization policy in the O-Cloud computing environment within the O-RAN.

The at least one processor may be further configured to execute the instructions to receive the O-Cloud optimization policy from the NRT-RIC within the SMO framework via an A1 interface.

The at least one processor may be further configured to execute the instructions to control to implement the O-Cloud optimization policy in the O-Cloud computing environment within the O-RAN via an O2 interface.

The at least one processor may be further configured to execute the instructions to receive data comprising at least one of performance data and event data from at least one physical host in the O-cloud computing environment within the O-RAN via the O2 interface.

The at least one processor may be further configured to execute the instructions to send and receive data of at least one O2 Management Service in the O-cloud computing environment via the O2 interface.

The at least one processor may be further configured to execute the instructions to control to implement the O-Cloud optimization policy via at least one O2 Management Service in the O-Cloud computing environment via an O2 interface.

The performance data of the at least one physical host may include a processor load, a memory usage, and a hard disk drive usage of the at least one physical host.

According to an embodiment, a method, for implementing an open cloud (O-Cloud) optimization policy by an application hosted in a near real-time radio access network Intelligent Controller (nRT-RIC) of a telecommunications network, includes: receiving, by the nRT-RIC, the O-Cloud optimization policy from a non-real-time radio access network Intelligent Controller (NRT-RIC) within a Service Management and Orchestration (SMO) framework of the telecommunications network; controlling to implement, by the nRT-RIC, the O-Cloud optimization policy in the O-Cloud computing environment within the O-RAN.

The method may include receiving, by the nRT-RIC, the O-Cloud optimization policy from the NRT-RIC within the SMO framework via an A1 interface.

The method may include controlling to implement, by the nRT-RIC, the O-Cloud optimization policy in the O-Cloud computing environment within the O-RAN via an O2 interface.

The method may include receiving, by the nRT-RIC, data comprising at least one of performance data and event data from at least one physical host in the O-cloud computing environment within the O-RAN via the O2 interface.

The method may include sending and receiving, by the nRT-RIC, data of at least one O2 Management Service in the O-cloud computing environment via the O2 interface.

The method may include controlling to implement, by the nRT-RIC, the O-Cloud optimization policy via at least one O2 Management Service in the O-Cloud computing environment via an O2 interface.

The performance data of the at least one physical host may include a processor load, a memory usage, and a hard disk drive usage of the at least one physical host.

According to an embodiment, a non-transitory computer-readable recording medium has recorded thereon instructions executable by at least one processor configured to implement a near real-time radio access network Intelligent Controller (nRT-RIC) within an open radio access network (O-RAN) architecture, to perform a method for implementing an open cloud (O-Cloud) optimization policy by an application hosted in the nRT-RIC, the method including: receiving, by the nRT-RIC, the O-Cloud optimization policy from a non-real-time radio access network Intelligent Controller (NRT-RIC) within a Service Management and Orchestration (SMO) framework of the telecommunications network; controlling to implement, by the nRT-RIC, the O-Cloud optimization policy in the O-Cloud computing environment within the O-RAN.

The method may include receiving, by the nRT-RIC, the O-Cloud optimization policy from the NRT-RIC within the SMO framework via an A1 interface.

The method may include controlling to implement, by the nRT-RIC, the O-Cloud optimization policy in the O-Cloud computing environment within the O-RAN via an O2 interface.

The method may include receiving, by the nRT-RIC, data comprising at least one of performance data and event data from at least one physical host in the O-cloud computing environment within the O-RAN via the O2 interface.

The method may include sending and receiving, by the nRT-RIC, data of at least one O2 Management Service in the O-cloud computing environment via the O2 interface.

The method may include controlling to implement, by the nRT-RIC, the O-Cloud optimization policy via at least one O2 Management Service in the O-Cloud computing environment via an O2 interface.

Additional aspects will be set forth in part in the description that follows and, in part, will be apparent from the description, or may be realized by practice of the presented embodiments of the disclosure

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
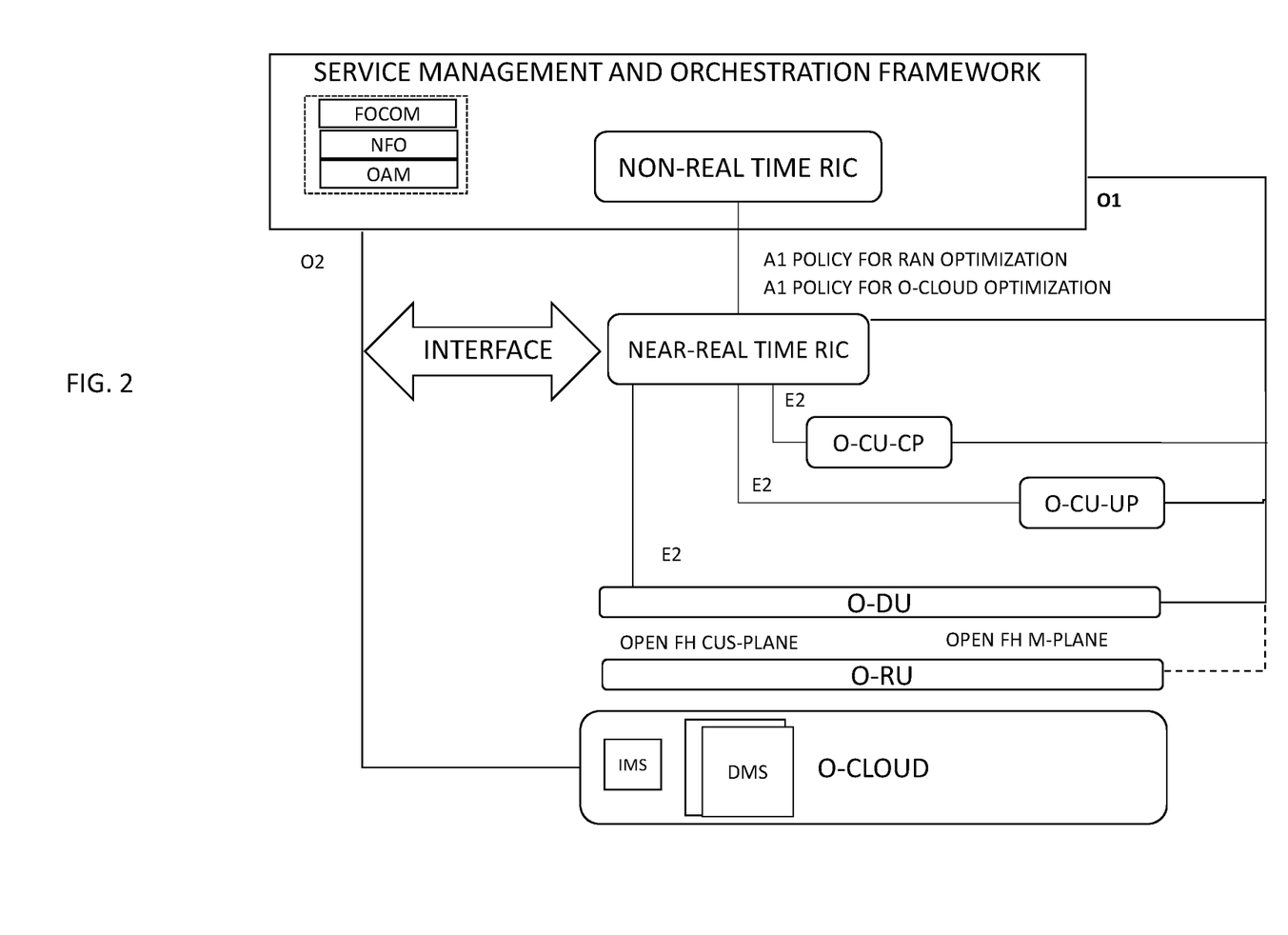
FIG. 2 illustrates the system for O-Cloud resource optimization via the nRT-RIC within an O-RAN architecture according to one or more embodiments.

FIG. 2 illustrates the system for O-Cloud resource optimization via the nRT-RIC within an O-RAN architecture according to one or more embodiments. Referring to FIG. 2, the key components of the O-RAN architecture are similar to FIG. 1.

In FIG. 2, the nRT-RIC connects to E2-nodes (i.e., O-CU-CP, O-CU-UP, O-DU, etc.) via the E3 interface. The nRT-RIC includes a plurality of applications, so-called xApps, and services that are required to support the execution of the xApps. The xApp may be one or more microservices that can be used to perform radio resource management through interfaces and service models. The xApps according to the related art receive data from the RAN (e.g., key performance indicators (KPIs) of E2 nodes) and, if necessary, compute and send back control actions (e.g., to the E2 nodes) in accordance with A1 policies for RAN optimization received over the A1 interface from the NRT-RIC.

The nRT-RIC is deployed at the edge of the RAN and operates control loops and analytical functions with a defined periodicity between 10 ms and 1 s. This defined response time periodicity (i.e., a defined latency) allows the nRT-RIC to realize analytical and control functions of the RAN in near real-time. Moreover, the defined latency of the nRT-RIC has an upper latency limit that is equal to or less than the latency of the NRT-RIC within the SMO (i.e., the NRT-RIC has a minimum response time of is with no defined upper latency limit).

Furthermore, as the nRT-RIC is located on the edge of the O-RAN network, it is also located closer to the O-Cloud computation and hardware resources which host the applications of the E2 nodes (i.e., the applications of the O-CU-CP, O-CU-UP, O-DU, etc., running in the O-Cloud).

Referring to FIG. 2, the nRT-RIC includes one or more xApps that receive data from the O-Cloud computing environment (i.e., performance data and/or event data)—if necessary—compute and send back control actions for implementing an open cloud (O-Cloud) optimization policy (e.g., an O-Cloud resource optimization policy, an O-Cloud infrastructure optimization policy, etc.) into the O-Cloud computing environment.

To this end, the O2 interface extends to or terminates at the nRT-RIC. In another example embodiment, the O2 interface may branch to the nRT-RIC.

According to an embodiment, the O2 interface between the nRT-RIC and the O-Cloud computational environment allows for a low latency data communication between the nRT-RIC and the O-Cloud computational environment (i.e., the O-Cloud computational resources which host the applications of the E2 nodes).

In an example embodiment, the nRT-RIC (e.g., one or more xApps of the nRT-RIC) may obtain O2 interface data via an application programming interface (API) of the O2 interface. The O2 interface data may include O-Cloud resource data such as O-Cloud infrastructure data of the O-Cloud environment from the O2 management services (i.e., the infrastructure management services (IMS) and the Deployment Management Service (DMS)).

For example, the IMS connects with the nRT-RIC, wherein the O2 interface provides functions that are responsible for the deployment and management of cloud infrastructure resources (i.e., the IMS orchestrates the O-Cloud infrastructure).

In another example, the DMS may connect with the nRT-RIC, wherein the O2 interface provides a set of interface functions responsible for the management of virtualized/containerized deployments on the O-Cloud infrastructure (i.e., the DMS orchestrates the virtualized/containerized deployments of the E2 nodes applications).

As a result, either one of the two service-based interfaces (SBIs) of the O2 interface (IMS and/or DMS) between the SMO framework and the O-Cloud platform (FOCOM-IMS and NFO-DMS) according to the O2 interface in FIG. 2 communicates with and/or terminates at the nRT-RIC.

Still referring to FIG. 2, the NRT-RIC within the SMO, in addition to the A1 policy to guide the nRT-RIC towards better fulfillment of the RAN intent (i.e., a RAN optimization policy), also provides an A1 policy for the optimization of O-Cloud (e.g., an O-Cloud resource policy, an O-cloud infrastructure policy, etc.).

To this end, the NRT-RIC according to FIG. 2 provides the A1 policy to guide the nRT-RIC towards the optimization of the O-Cloud computing environment within the O-RAN (i.e., the O-Cloud optimization policy) and the nRT-RIC, based on receiving the A1 policy, acts on the policy to control the implementation of the O-Cloud resource optimization policy in the O-Cloud computing environment via the O2 interface with O2 management services in the O-Cloud (e.g., the nRT-RIC may start acting on the policy and perform a control loop of the implementation of the O-Cloud resource optimization policy to the O-Cloud computing resources).

In an example embodiment, the interface between the nRT-RIC and the O-Cloud computing environment according to FIG. 2 (i.e., the O2 management services orchestrating either the physical hosts such as servers or server clusters or the virtualized/containerized deployments of the E2 nodes applications of the O-RAN) may be a bidirectional interface that allows an nRT-RIC to control the implementation of the O-Cloud optimization policy in the O-Cloud computing environment within the O-RAN. The nRT-RIC receives, over the O2 interface, data that includes at least one of performance data and event data from the at least one physical host in the O-cloud computing environment within the O-RAN. In an example embodiment, the performance data and event data of at least one physical host in the O-Cloud computing environment may include O-Cloud infrastructure data such as a processor load, memory usage, hard disk drive usage, etc., of the at least one physical host.

Moreover, the interface between the nRT-RIC and the O-Cloud computing environment according to FIG. 2 enables the SMO framework (e.g., the NRT-RIC) to apply an O-Cloud optimization policy (i.e., the A1 policy received from the NRT-RIC) more efficiently.

The technical advantage of the O2 interface according to FIG. 2, as set forth above, over the O2 interface according to the related art is enabling O-Cloud optimization policy implementation at the nRT-RIC thereby achieving a significant reduction in response time latency (i.e., periodicity of the control loop) by interfacing the nRT-RIC with the O-Cloud computing environment (i.e., with the management services orchestrating of the O-Cloud resources).

In particular, the O2 interface according to the O-RAN architecture of FIG. 2 allows the nRT-RIC to access O2 interface data (i.e., non-RAN data) and take actions on (or implement) A1 policies (i.e., O-Cloud resource optimization policies) received from the NRT-RIC.

The defined response latency of the nRT-RIC has the technical effect that a change in (i.e., optimization of) the O-Cloud can be achieved between 10 ms and 1 s, wherein 1 s is the maximum periodicity of the nRT-RIC control loop to implement an A1 policy (i.e., O-Cloud resource optimization policies) in the O-Cloud computing environment in near real-time.

As a result, the interface between the nRT-RIC and the O-Cloud (i.e., with the management services orchestrating the O-Cloud resources) according to the O-RAN architecture for O-Cloud resource optimization via the nRT-RIC allows a significant reduction of O-Cloud resource control latency. The low latency O-Cloud resource control results in a faster implementation of O-cloud optimization policies, which has the advantage that an energy-efficient network operation of the O-cloud computing environment can be achieved.

Figure 3:
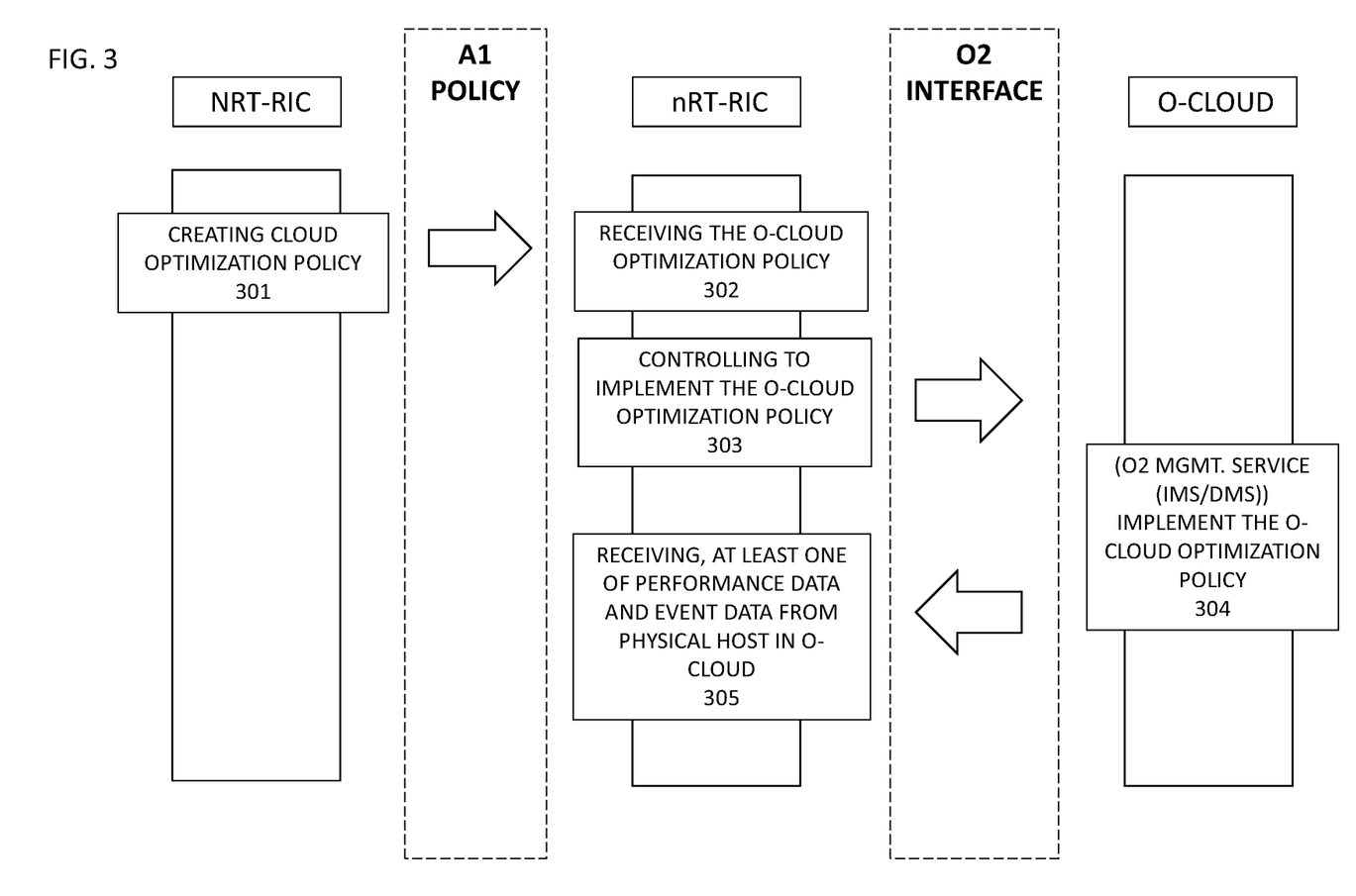
FIG. 3 is a diagram of a flowchart of the method for implementing an open cloud (O-Cloud) optimization policy using an interface between the nRT-RIC and the O-Cloud according to an embodiment.

FIG. 3 is a diagram of a flowchart of the method for implementing an O-Cloud optimization policy using an interface between the nRT-RIC and the O-Cloud according to an embodiment.

Referring to FIG. 3, in operation 301, the NRT-RIC creates an O-Cloud optimization policy (i.e., the A1 policy for optimization of the O-Cloud). To this end, the NRT-RIC within the SMO framework controls O-Cloud strategies through AI/ML learning from network data (e.g., performance data and event data from at least one physical host in an O-cloud computing environment received via the O2 interface, performance data and/or event data from O-RAN functions via the O1 interface, etc.).

In operation 302, the nRT-RIC receives the O-Cloud optimization policy from the NRT-RIC. For example, the nRT-RIC receives the O-Cloud optimization policy in form of an A1 policy.

In operation 303, upon receiving the policy for O-Cloud optimization, the nRT-RIC starts acting on the policy. In an example embodiment of FIG. 3, the nRT-RIC may control the implementation of the O-Cloud optimization policy into the O-Cloud computing environment within the O-RAN. For example, one or more xApps of the nRT-RIC may connect to the O2 Management services (i.e., IMS and/or DMS) orchestrating the O-Cloud computing environment, wherein the xApps via the O2 interface API may receive data from the O2 Management services (i.e., performance data and/or event data such as non-RAN data) and, if necessary, compute and send back control actions for implementing an O-Cloud optimization policy in the O-Cloud computing environment.

In operation 304, the O-Cloud computing environment within the O-RAN (i.e., O2 Management services (IMS and/or DMS) orchestrating the O-Cloud computing environment) implements the O-Cloud optimization policy. For example, the O2 management services may implement auto-scaling of O-Cloud instances (i.e., auto-scaling of virtualized/containerized deployments of the E2 node applications) in accordance with the O-Cloud optimization policy, wherein the IMS orchestrates a resource management policy in accordance with a use case manifested in the O-Cloud optimization policy provided by the NRT-RIC.

In operation 305, the nRT-RIC receives data comprising at least one of performance data and event data from at least one physical host in the O-cloud computing environment within the O-RAN to control the implementation of the O-Cloud optimization policy as requested (e.g., the O2 Management services (IMS and/or DMS) may provide non-RAN data to the nRT-RIC).

For example, operations 303, 304, and 305 of FIG. 3 may be performed via the O2 interface of FIG. 2, and may be performed sequentially, simultaneously, or in different orders, and may be performed continuously, periodically, etc.

In accordance with the embodiment in FIG. 3, the access to the O2 interface enables the nRT-RIC to control the adaptation of diverse scenarios and objectives, in particular, the fast response time of the nRT-RIC via the O2 interface allows RAN operators (i.e., mobile network operators MNO) to specify different objectives for network function placements depending on a wide variety of scenarios and allows for more flexibly to configure optimization policies within the SMO.

Figure 4:
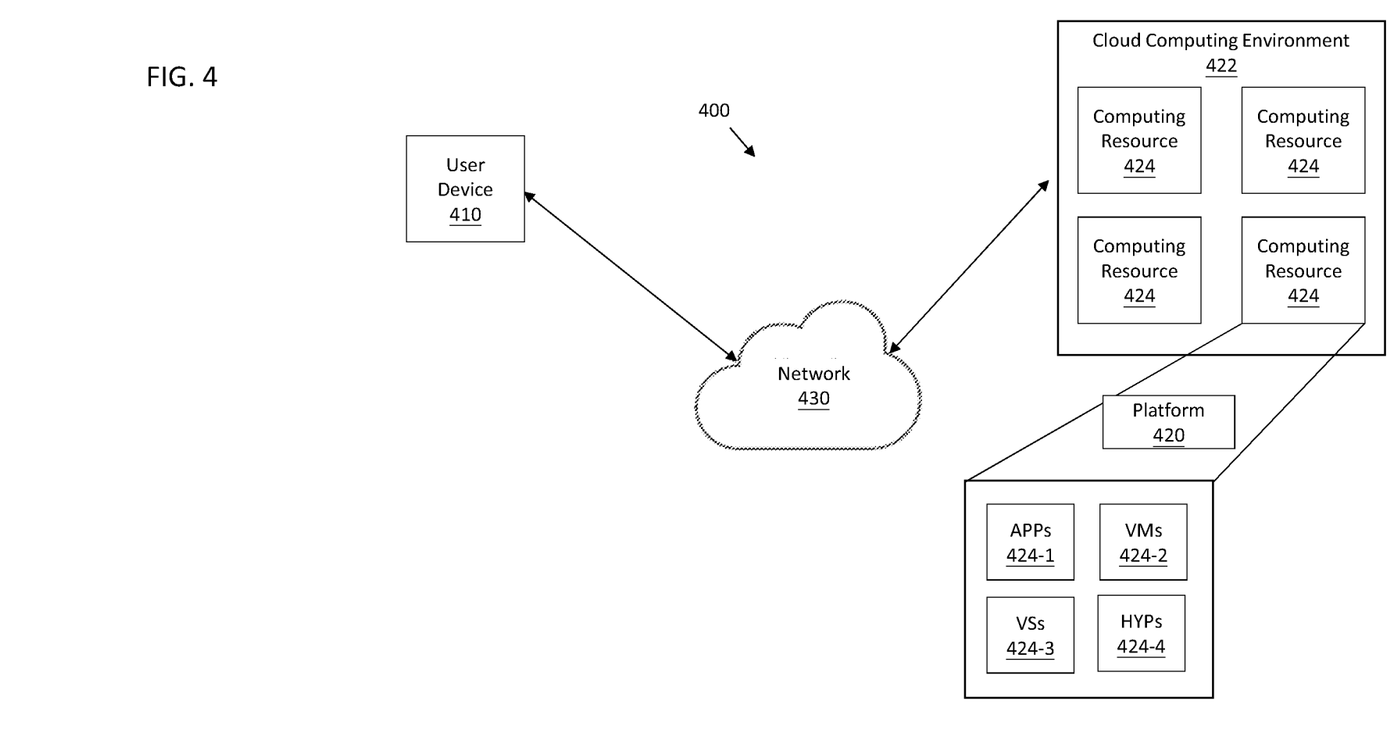
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types
of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
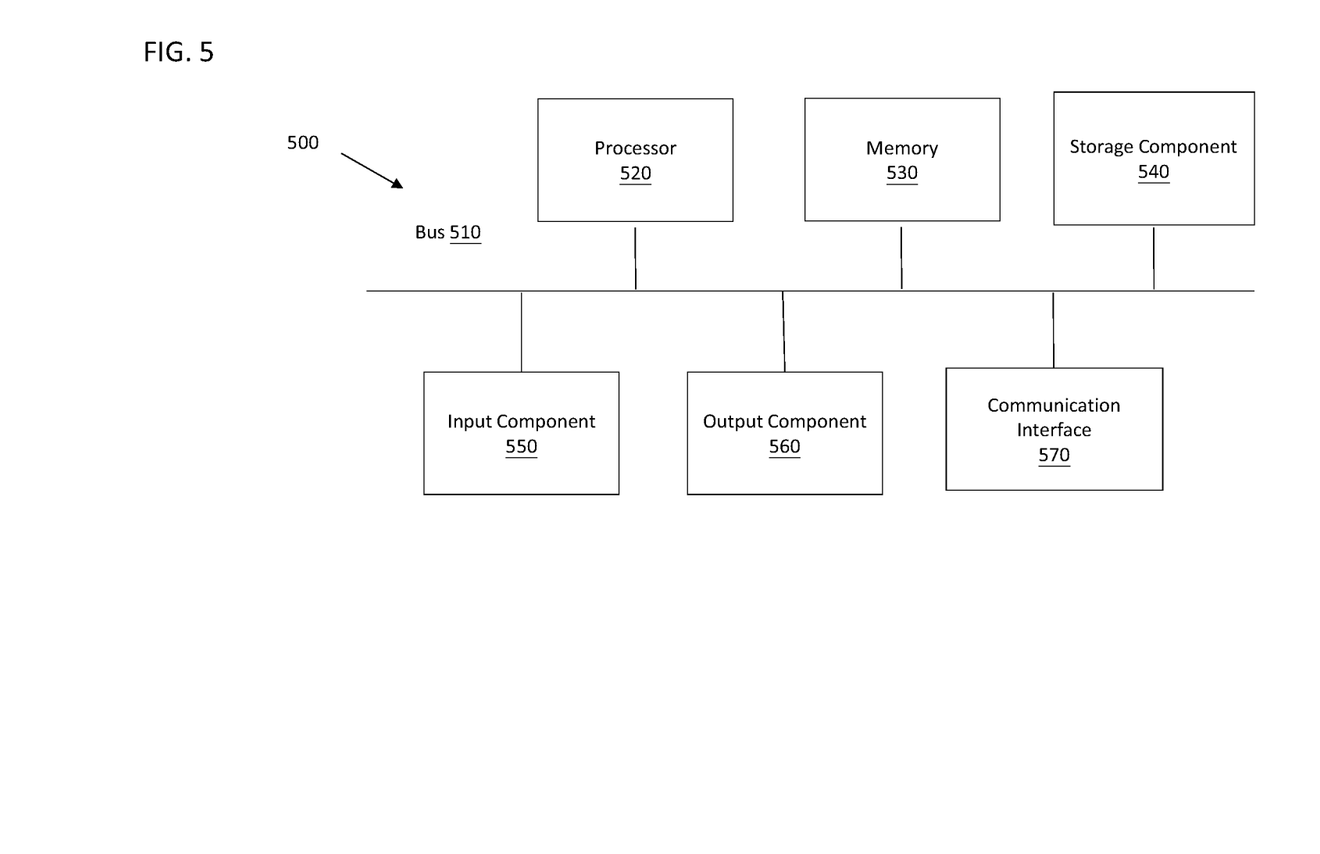
FIG. 5 is a diagram of example components of a device according to an embodiment.

FIG. 5 is a diagram of example components of a device 500. Device 500 may correspond to user device 510 and/or platform 520. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read-only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500
may perform one or more functions described as being performed by another set of components of device 500.

In embodiments, any one of the operations or processes of FIGS. 1, 2, 3 may be implemented by or using any one of the elements illustrated in FIGS. 4 and 5.

According to embodiments, systems and methods are provided for implementing an O-Cloud optimization policy, wherein the nRT-RIC controls to implement the O-Cloud optimization policy into an O-Cloud computing environment within the O-RAN via a direct interface between the nRT-RIC and the O-Cloud computing environment. The direct interface nRT-RIC and the O-Cloud reduces latency to near real-time. As a result, low latency resource control allows for an energy-efficient network operation of the RAN.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for implementing an open cloud (O-Cloud) optimization policy by an application hosted in a near real-time radio access network Intelligent Controller (nRT-RIC) of a telecommunications network, the system comprising:
   a memory storing instructions; and
   at least one processor configured to implement the nRT-RIC within an open radio access network (O-RAN) architecture, the nRT-RIC being communicatively coupled to an O-Cloud computing environment within the O-RAN via an interface, the at least one processor configured to execute the instructions to:
   receive the O-Cloud optimization policy from a non-real-time radio access network Intelligent Controller (NRT-RIC) within a Service Management and Orchestration (SMO) framework of the telecommunications network;
   control to implement, via the interface, the O-Cloud optimization policy in the O-Cloud computing environment within the O-RAN.

2. The system as claimed in claim 1, wherein the at least one processor is configured to execute the instructions to:
   receive the O-Cloud optimization policy from the NRT-RIC within the SMO framework via an A1 interface.

3. The system as claimed in claim 2, wherein the at least one processor is further configured to execute the instructions to:
   receive data comprising at least one of performance data and event data from at least one physical host in the O-cloud computing environment within the O-RAN via the interface between the nRT-RIC and the O-Cloud computing environment.

4. The system as claimed in claim 3, wherein the at least one processor is further configured to execute the instructions to:
   send and receive data of at least one O2 Management Service in the O-cloud computing environment via the interface between the nRT-RIC and the O-Cloud computing environment.

5. The system as claimed in claim 2, wherein the at least one processor is further configured to execute the instructions to:
   control to implement the O-Cloud optimization policy via at least one O2 Management Service in the O-Cloud computing environment via the interface between the nRT-RIC and the O-Cloud computing environment.

6. The system as claimed in claim 3, wherein the performance data of the at least one physical host comprises a processor load, a memory usage, and a hard disk drive usage of the at least one physical host.

7. A method for implementing an open cloud (O-Cloud) optimization policy by an application hosted in a near real-time radio access network Intelligent Controller (nRT-RIC) of a telecommunications network, the nRT-RIC being communicatively coupled to an O-Cloud computing environment within an open radio access network (O-RAN) via an interface, the method comprising:
   receiving, by the nRT-RIC, the O-Cloud optimization policy from a non-real-time radio access network Intelligent Controller (NRT-RIC) within a Service Management and Orchestration (SMO) framework of the telecommunications network;
   controlling to implement, by the nRT-RIC via the interface, the O-Cloud optimization policy in the O-Cloud computing environment within the O-RAN.

8. The method as claimed in claim 7, wherein the method comprises:
   receiving, by the nRT-RIC, the O-Cloud optimization policy from the NRT-RIC within the SMO framework via an A1 interface.

9. The method as claimed in claim 8, wherein the method comprises:
   receiving, by the nRT-RIC, data comprising at least one of performance data and event data from at least one physical host in the O-cloud computing environment within the O-RAN via the interface between the nRT-RIC and the O-Cloud computing environment.

10. The method as claimed in claim 9, wherein the method comprises:
    sending and receiving, by the nRT-RIC, data of at least one O2 Management Service in the O-cloud computing environment via the interface between the nRT-RIC and the O-Cloud computing environment.

11. The method as claimed in claim 8, wherein the method comprises:
    controlling to implement, by the nRT-RIC, the O-Cloud optimization policy via at least one O2 Management Service in the O-Cloud computing environment via an the interface between the nRT-RIC and the O-Cloud computing environment.

12. The method as claimed in claim 9, wherein the performance data of the at least one physical host comprises a processor load, a memory usage, and a hard disk drive usage of the at least one physical host.

13. A non-transitory computer-readable recording medium having recorded thereon instructions executable by at least one processor configured to implement a near real-time radio access network Intelligent Controller (nRT-RIC) within an open radio access network (O-RAN) architecture, to perform a method for implementing an open cloud (O-Cloud) optimization policy by an application hosted in the nRT-RIC, the nRT-RIC being communicatively coupled to an O-Cloud computing environment within the O-RAN via an interface, the method comprising:
    receiving, by the nRT-RIC, the O-Cloud optimization policy from a non-real-time radio access network Intelligent Controller (NRT-RIC) within a Service Management and Orchestration (SMO) framework of the telecommunications network;
    controlling to implement, by the nRT-RIC via the interface, the O-Cloud optimization policy in the O-Cloud computing environment within the O-RAN.

14. The non-transitory computer-readable recording medium as claimed in claim 13, wherein the method comprises:
    receiving, by the nRT-RIC, the O-Cloud optimization policy from the NRT-RIC within the SMO framework via an A1 interface.

15. The non-transitory computer-readable recording medium as claimed in claim 14, wherein the method comprises:
    receiving, by the nRT-RIC, data comprising at least one of performance data and event data from at least one physical host in the O-cloud computing environment within the O-RAN via the interface between the nRT-RIC and the O-Cloud computing environment.

16. The non-transitory computer-readable recording medium as claimed in claim 15, wherein method comprises:
    sending and receiving, by the nRT-RIC, data of at least one O2 Management Service in the O-cloud computing environment via the interface between the nRT-RIC and the O-Cloud computing environment.

17. The non-transitory computer-readable recording medium as claimed in claim 14, wherein the method comprises:

controlling to implement, by the nRT-RIC, the O-Cloud optimization policy via at least one O2 Management Service in the O-Cloud computing environment via the interface between the nRT-RIC and the O-Cloud computing environment.

18. The system as claimed in claim 1, wherein the interface is an O2 interface.

19. The system as claimed in claim 18, wherein the O2 interface is further communicatively coupled with the SMO and the O-Cloud computing environment.

20. The system as claimed in claim 1, wherein the application hosted in the nRT-RIC controls an O-DU or an O-RU via a different interface from the interface between the nRT-RIC and O-Cloud computing environment.

21. The system as claimed in claim 1, wherein the application hosted in the nRT-RIC controls an O-DU or an O-RU by implementing a different policy generated by the NRT-RIC from the O-Cloud optimization policy.

22. The method as claimed in claim 7, wherein the interface is an O2 interface.

23. The method as claimed in claim 22, wherein the O2 interface is further communicatively coupled with the SMO and the O-Cloud computing environment.

24. The method as claimed in claim 7, wherein the application hosted in the nRT-RIC controls an O-DU or an O-RU via a different interface from the interface between the nRT-RIC and O-Cloud computing environment.

25. The method as claimed in claim 7, wherein the application hosted in the nRT-RIC controls an O-DU or an O-RU by implementing a different policy generated by the NRT-RIC from the O-Cloud optimization policy.

* * * * *